(12) United States Patent
Han et al.

(10) Patent No.: US 11,946,783 B2
(45) Date of Patent: Apr. 2, 2024

(54) PHOTON MEASURING AND READING DEVICE

(71) Applicant: SOPHONIX CO., LTD., Beijing (CN)

(72) Inventors: Kuiliang Han, Beijing (CN); Shiliang Zhou, Beijing (CN); Xiqiang Zhang, Beijing (CN); Yongcheng Sun, Beijing (CN); Haiyang Zhang, Beijing (CN)

(73) Assignee: SOPHONIX CO., LTD., Beijing (CN)

( * ) Notice: Subject to any disclaimer, the term of this patent is extended or adjusted under 35 U.S.C. 154(b) by 270 days.

(21) Appl. No.: 17/569,530

(22) Filed: Jan. 6, 2022

(65) Prior Publication Data

US 2022/0128385 A1 Apr. 28, 2022

Related U.S. Application Data

(63) Continuation of application No. PCT/CN2020/104913, filed on Jul. 27, 2020.

(30) Foreign Application Priority Data

May 6, 2020 (CN) .......................... 202010372560.5

(51) Int. Cl.
*G01N 21/64* (2006.01)
*G01D 5/36* (2006.01)
(Continued)

(52) U.S. Cl.
CPC ............... *G01D 5/36* (2013.01); *G01D 11/30* (2013.01); *G03B 9/07* (2013.01); *G03B 9/08* (2013.01)

(58) Field of Classification Search
CPC . G01D 5/36; G01D 11/30; G03B 9/07; G03B 9/08; G01J 1/044; G01J 1/0403;
(Continued)

(56) References Cited

U.S. PATENT DOCUMENTS

| | | | |
|---|---|---|---|
| 2011/0212844 A1 | 9/2011 | Yanik et al. | |
| 2013/0079236 A1* | 3/2013 | Holmes | G01N 35/00 204/600 |
| 2021/0394175 A1* | 12/2021 | Guarnieri | B01L 3/5029 |

FOREIGN PATENT DOCUMENTS

| CN | 201974432 | 9/2011 |
|---|---|---|
| CN | 205120560 | 3/2016 |

(Continued)

OTHER PUBLICATIONS

"International Search Report (Form PCT/ISA/210) of PCT/CN2020/104913," dated Jan. 27, 2021, with English translation thereof, pp. 1-5.

*Primary Examiner* — Kiho Kim
(74) *Attorney, Agent, or Firm* — JCIP GLOBAL INC.

(57) ABSTRACT

The present application relates to a photon measuring and reading device, which belongs to the field of detection equipment, including a mounting seat and a photon counter. The photon counter can move up and down on the mounting seat. The mounting seat is provided with a vertically arranged sliding trough, and the photon counter is provided with a sliding rod slidably connected with the sliding trough. A double head motor is arranged on the mounting base, and a linkage mechanism is arranged between the output shaft at the tail end of the double head motor and the sliding rod. The bottom end of the photon counter is fixed with a box body.

10 Claims, 9 Drawing Sheets

(51) Int. Cl.
*G01D 11/30* (2006.01)
*G03B 9/07* (2021.01)
*G03B 9/08* (2021.01)

(58) Field of Classification Search
CPC ...... G01J 1/42; G01J 2001/442; G01N 21/76;
G01N 35/00; G01N 33/5302; G01N
35/00584; G01N 35/04; G01N 2035/0491
See application file for complete search history.

(56) References Cited

FOREIGN PATENT DOCUMENTS

| | | |
|---|---|---|
| CN | 209264737 | 8/2019 |
| CN | 209459761 | 10/2019 |
| JP | 2018163102 | 10/2018 |

\* cited by examiner

PHOTON MEASURING AND READING DEVICE

CROSS-REFERENCE TO RELATED APPLICATION

This application is a continuation of international PCT application serial no. PCT/CN2020/104913, filed on Jul. 27, 2020, which claims a priority and benefit of China patent application No. 202010372560.5 filed on May 6, 2020. The entirety of the above-mentioned patent applications are hereby incorporated by reference herein and made a part of this specification.

TECHNICAL FIELD

The present application relates to the technical field of detection equipment, and in particular to a photon measuring and reading device.

BACKGROUND ART

Chemiluminescence immunoanalyzer is a new labeled immunoassay technology which combines chemiluminescence with immune reaction for detecting trace antigens and antibodies. A chemiluminescence immunoanalyzer includes two parts: an immune response system and a chemiluminescence analysis system. The immune reaction system marks a luminescent substance directly on an antigen or antibody to form a conjugate through immunological specific immune reaction, which acts on a luminescent base body via a catalyst. The chemiluminescence analysis system forms an excited state intermediate by catalyzing a chemiluminescent substance using a catalyst and oxidizing the same using an oxidant. When the excited state intermediate returns to a stable ground state, photons are emitted at the same time, and the quantum yield of luminescence is measured by a luminescence signal measuring instrument.

The core detector of the chemiluminescence immunoanalyzer is a photomultiplier tube, which is a vacuum electronic device that can convert weak optical signal into electrical signal. It is detected by single photon and transmitted to amplifier, and amplified by high-voltage current. The amplifier converts analog current into digital current, and the digital current transmits the luminous signal from data line to computer and calculates it to obtain the detection result.

A China patent application No. CN201974432U discloses an automatic device for optical signal detection, including a support, on which a dense light device and a detection device are successively arranged along a straight line. The dense light device includes a shutter and a control mechanism guiding the shutter to contact the detection device or move away therefrom. The detection device comprises a detection optical device, a hanger for fixing the reaction tube, and a shutter interface for matching and connecting with the shutter. A pipe moving device for transporting the reaction pipe into or out of the detection device is also arranged under the hanger.

The existing technical solution in the above has the following defects. When controlling the detection device and the detected object to approach each other, the detected object is sent to the detection device through the pipe moving device for detection, and when the shutter is controlled, it is controlled through the control structure. It can be seen that the control of the distance between the detection device and the detected object and the control of the shutter are performed separately, so that the overall structure of the automatic device for optical signal detection is relatively complex. Further, since the control of the distance between the detection device and the detected object and the control of the shutter are performed separately, inconsistent operations are easy to occur when there is a problem with the system, which will negatively affect the detected data.

SUMMARY

In view of the shortcomings present in the existing technologies, the present application provides a measuring and reading device, which is capable of simultaneously controlling up and down movement of a photon counter and controlling a shutter structure through a control mechanism.

The present application provides the following technical solution.

A photon measuring and reading device includes a mounting seat and a photon counter with a data acquiring port facing downward, and the photon counter can be moved up and down on the mounting seat;

the mounting seat is provided with a sliding trough extending through the mounting seat and is arranged vertically, and the photon counter is fixed with a sliding rod passing through the sliding trough and slidably connected with the sliding trough;

the mounting seat is provided with a double head motor having an output shaft at a head end and an output shaft at a tail end and arranged laterally side by side with the photon counter, the output shaft at the tail end of the double head motor extends through and out of the mounting seat, and a linkage mechanism for driving the sliding rod to move up and down is arranged between the output shaft at the tail end of the double head motor and the sliding rod;

a bottom end of the photon counter is fixed with a hollow box body, the data acquiring port of the photon counter is communicated with the interior of the box body, a side wall of the box body away from the photon counter is provided with a light inlet opposite to the data acquiring port of the photon counter, a light-blocking block capable of covering the light inlet is arranged in the box body, a push rod extending through a side wall of the box body is arranged at one end of the light-blocking block facing the double head motor, the push rod is slidably connected with a side wall of the box body, one end of the push rod is fixedly connected with the light-blocking block, and the other end of the push rod is located outside the box body, acting as a free end of the push rod; and a driving level is arranged on the output shaft at the head end of the double head motor, and is capable of pushing the push rod so that the light-blocking block is moved off the light inlet when the photon counter is moved to the lowest position; and the box body is provided with an elastic resetting member pushing the push rod to move towards the outside of the box body so that the light-blocking block is positioned opposite to the light inlet.

In the above technical solution, when the output shaft of the double head motor is rotated, the photon counter is driven to move up and down through the linkage mechanism. When the photon counter is moved to the lowest position, the driving level on the output shaft at the head end of the double head motor pushes the push rod while rotating with the output shaft, so as to move the push rod toward the interior of the box body. When the push rod is moved towards the interior of the box body, the push rod drives the light-blocking block to move, so that the light-blocking block is moved off the light inlet. When the light-blocking block is moved off the light inlet, the data acquiring port of the photon counter is connected with the light inlet, the photon counter can measure and read the photons of the measured object, and can synchronously drive the photon counter to move up and down and control the shutter structure through a double head motor.

In a preferred embodiment of the present application, the linkage mechanism includes a cam fixed on the output shaft at the tail end of the double head motor, the sliding rod includes a sliding portion passing through the sliding trough and slidably connected with the sliding trough, and an end of the sliding portion away from the photon counter is provided with a bending portion extending toward the double head motor and located above the cam, and the cam can drive the bending portion to move up and down when being rotated with the output shaft at the tail end of the double head motor.

In the above technical solution, by using the cam to push the bending portion to move up and down, the cam constantly abuts against the bending portion due to the gravity of the photon counter when the photon counter is moved up and down, so that the photon counter can be moved up and down stably.

In a preferred embodiment of the present application, a roller is arranged between the bending portion and the cam, and the roller is rotationally connected to the bending portion.

In the above technical solution, the friction between the bending portion and the cam is reduced, so as to increase the service life of the bending portion and the cam.

In a preferred embodiment of the present application, the cam comprises a base body coaxially arranged with the output shaft at the tail end of the double head motor, the edge of the base body is provided with a radius varying portion with gradually increased distance from the edge to the circle center of the base body, the end of the radius varying portion having a farthest distance from the edge to the circle center of the base body is provided with an arc-shaped extension part concentric with the base body, an arc-shaped clamping slot capable of clamping the roller is formed between the extension part and the base body, the circle center of the clamping slot is located on the circle center of the base body, and the mounting seat is provided with a control mechanism for controlling the output shaft at the tail end of the double head motor to rotate forward and reverse alternately.

In the above technical solution, by controlling the cam to rotate forward and reverse alternately, the driving level may abut against the push rod when pushing the push rod, at the same time, the spacing between the photon counter and the double head motor can be shortened.

In a preferred embodiment of the present application, the control mechanism comprises a photoelectric switch installed on the mounting seat and a turntable fixed on the output shaft at the tail end of the double head motor, a notch is arranged at the edge of the turntable, the photoelectric switch is in signal connection with the double head motor, and includes an infrared transmitting portion and an infrared receiving portion respectively positioned on opposite sides of the turntable, and the infrared transmitting portion and the infrared receiving portion are arranged opposite to each other. When the turntable is rotated with the output shaft of the double head motor, the notch can be opposite to the infrared transmitting portion and the infrared receiving portion.

In the above technical solution, when the notch is opposite to the infrared transmitting portion and the infrared receiving portion, the signal sent by the infrared transmitting portion is received by the infrared receiving portion. When the infrared receiving portion receives the signal sent by the infrared transmitting portion, it transmits the signal to the double head motor to rotate the double head motor in a reverse direction.

In a preferred embodiment of the present application, the mounting seat is provided with an elastic pulling piece for pulling the sliding rod to move downward.

In the above technical solution, the elastic pulling piece provides a downward pulling force for the photon counter when moving downward, so that the photon counter is easier to move downward, so as to reduce the occurrence of jamming of the photon counter when moving.

In a preferred embodiment of the present application, a variable diaphragm with adjustable optical aperture is arranged between the light-blocking block and the light inlet in the interior of box body.

In the above technical solution, the optical aperture of the variable diaphragm can be adjusted according to actual needs, so as to increase the application range of the photon measuring and reading device.

In a preferred embodiment of the present application, the variable diaphragm comprises a fixed ring fixed inside the box body and a plurality of diaphragm sheets located inside the fixed ring. When the moving ring is rotated relative to the fixed ring, the diaphragm sheet is swung to change the optical aperture, and the box body is provided with an adjusting structure for rotating the moving ring.

In the above technical solution, the moving ring can be rotated by adjusting the adjusting structure. As the moving ring rotates, the diaphragm sheets is swung to change the size of the optical aperture and realize the adjustment of the optical aperture.

In a preferred embodiment of the present application, the adjusting structure includes an adjusting rod slidably connected with the box body, the axis of the adjusting rod is arranged perpendicular to the axis of the moving ring, the adjusting rod is provided with an adjusting groove having a length arranged along the axial direction of the adjusting rod, the moving ring is provided with a connecting rod, the connecting rod extends into the adjusting groove and is slidably connected with the adjusting groove, the connecting rod is sleeved with a telescopic spring, one end of the telescopic spring abuts against the side wall of the box body, the other end of the telescopic spring abuts against the connecting rod, one end of the adjusting rod is provided with a pushing member configured to push the adjusting rod to move along its own axial direction, and the pushing member extends out of the box body.

In the above technical solution, the pushing member extends out of the box body, so that it is convenient for the operator to adjust the optical aperture of the variable diaphragm when the variable diaphragm needs to be adjusted.

In a preferred embodiment of the present application, the pushing member includes an adjusting bolt connected with the thread of the box body, the adjusting bolt is provided with a locking spring, one end of the locking spring abuts against the nut of the adjusting bolt, and the other end of the locking spring abuts against the box body.

In the above technical solution, the locking spring applies a pushing force to the nut, so that the thread of the adjusting bolt closely fits with the thread on the box body, reducing the possibility of rotation of the adjusting bolt under a free state.

To sum up, the present application achieves at least one of the following beneficial technical effects.

1. When the output shaft of the double head motor rotates, the photon counter is driven to move up and down by the linkage mechanism. When the photon counter moves to the lowest position, the driving level on the output shaft at the head end of the double head motor pushes the push rod when rotating with the output shaft, so that the pushing rod move toward the interior of the box body. When the push rod moves toward the interior of the box body, the push rod drives the light-blocking block to move, so that the light-blocking block is moved off the light inlet. When the light-blocking block is moved off the light inlet, the data acquiring port of the photon counter is connected with the light inlet, the photon counter can measure and read the photons of the measured object. That is, the double head motor can synchronously drive the photon counter to move up and down while controlling the shutter structure.

2. By providing the variable aperture and adjusting structure for adjusting the variable aperture, the optical aperture of the variable diaphragm can be adjusted according to actual needs, so as to increase the application range of the photon measuring and reading device.

DETAILED DESCRIPTION

The present application will be further described below in details in connection with the accompanying drawings.

Figure 1:
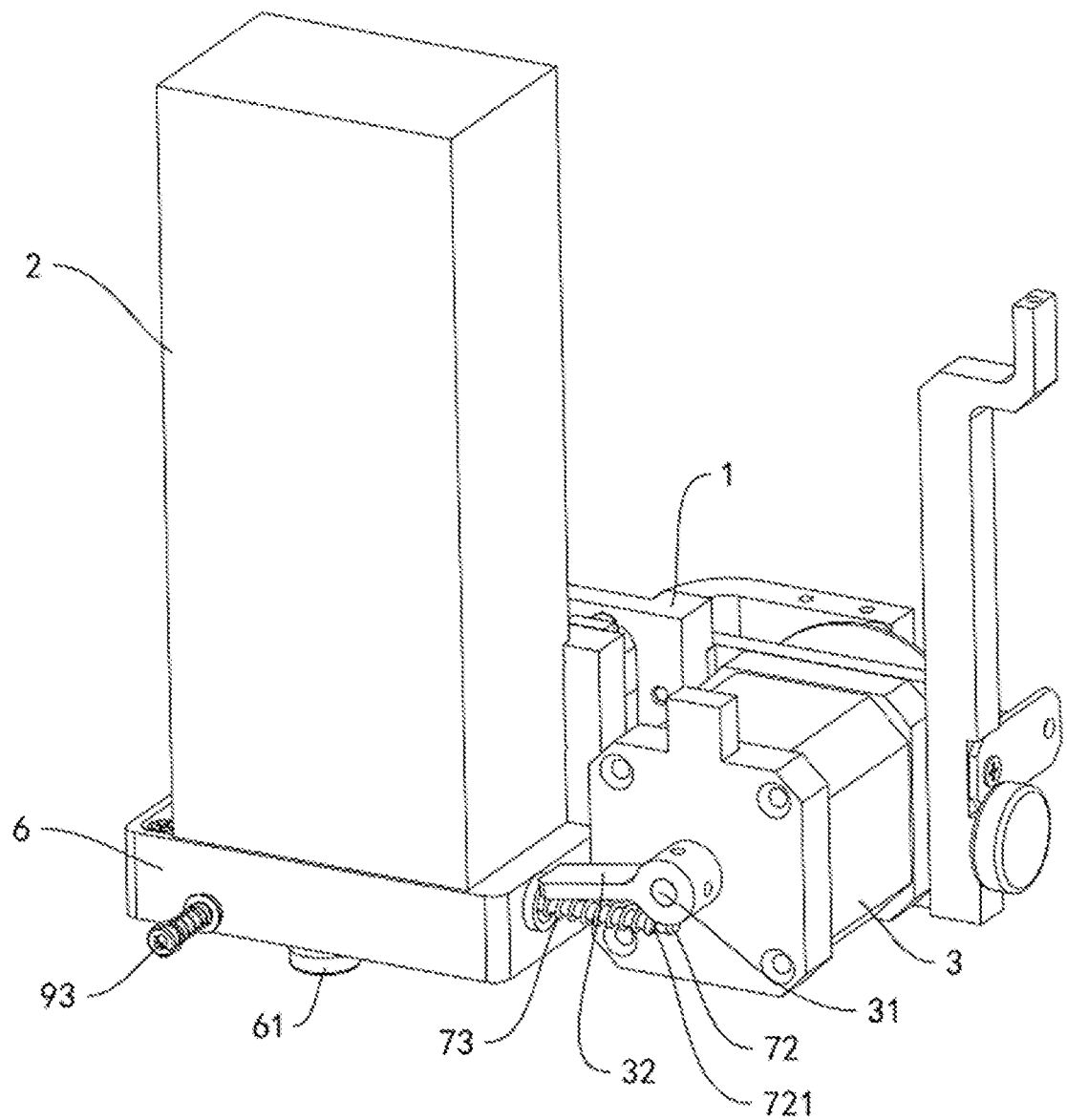
FIG. 1 is a structural diagram viewed from one side of the head end of the double head motor when the photon counter is located at the highest position.
Figure 2:
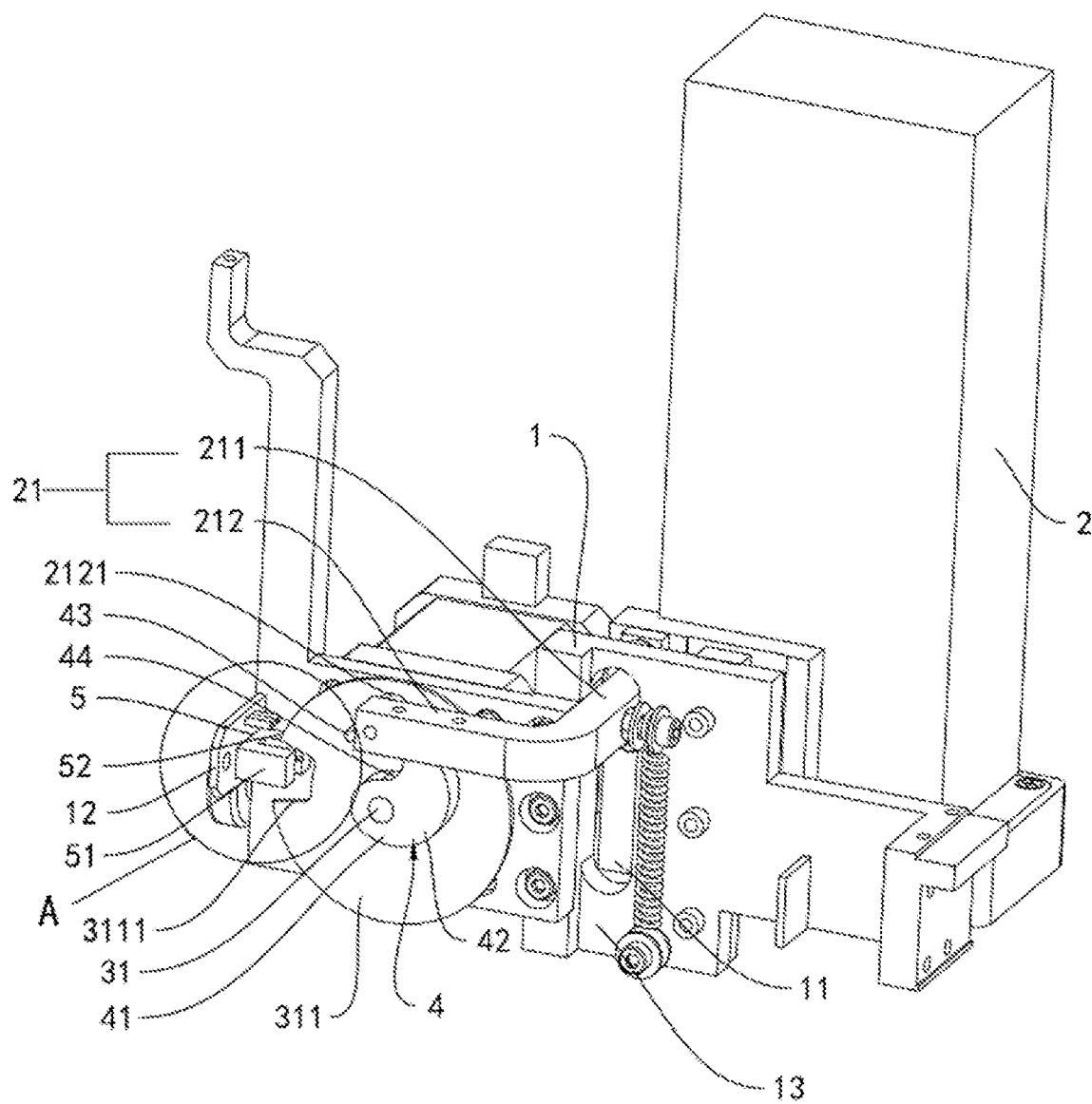
FIG. 2 is a structural diagram viewed from one side of the tail end of the double head motor when the photon counter is located at the highest position.

Referring to FIGS. 1 and 2, a photon measuring and reading device disclosed by the present application includes a mounting seat 1, a photon counter 2 with a data acquiring port facing downward and a double head motor 3 with an output shaft 31 at both ends, in which the photon counter 2 and the double head motor 3 are arranged laterally side by side on one of the side wall surfaces of the mounting seat 1. The photon counter 2 is slidably connected with the mounting seat 1. The photon counter 2 is arranged to be moved vertically along the side wall surface of the mounting seat 1. The double head motor 3 is bolted onto the mounting seat 1. The output shaft 31 of the double head motor 3 at the tail end extends through the mounting seat 1 and out of the side of the mounting seat 1 away from the double head motor 3.

A vertically arranged sliding trough 11 is arranged on the mounting seat 1 opposite to the photon counter 2. The photon counter 2 is provided with a sliding rod 21 extending through the sliding trough 11 and slidably connected with the sliding trough 11. The sliding rod 21 includes a sliding portion 211 passing through the sliding trough 11 and slidably connected with the sliding trough 11. One end of the sliding portion 211 is fixedly connected with the photon counter 2, and the other end of the sliding portion 211 extends through the sliding trough 11 and is located outside a side of the mounting seat 1 away from the photon counter 2. One end of the sliding portion 211 away from the photon counter 2 is provided with a bending portion 212 extending laterally in the direction of the double head motor 3, and the bending portion 212 is located above the output shaft 31 of the double head motor 3 at the tail end. The bending portion 212 is integrally formed with the sliding portion 211.

A cam 4 is fixed on the output shaft 31 at the tail end of the double head motor 3, and the cam 4 and the bending portion 212 are arranged in different planes. A roller 2121 is rotationally connected on the side of the bending portion 212 towards the cam 4, and abuts against a side wall surface of the cam 4. The axis of the roller 2121 is parallel to the axis of the output shaft 31 of the double head motor 3. The axis of the roller 2121 is located on the same vertical plane as the axis of the double head motor 3.

Figure 4:
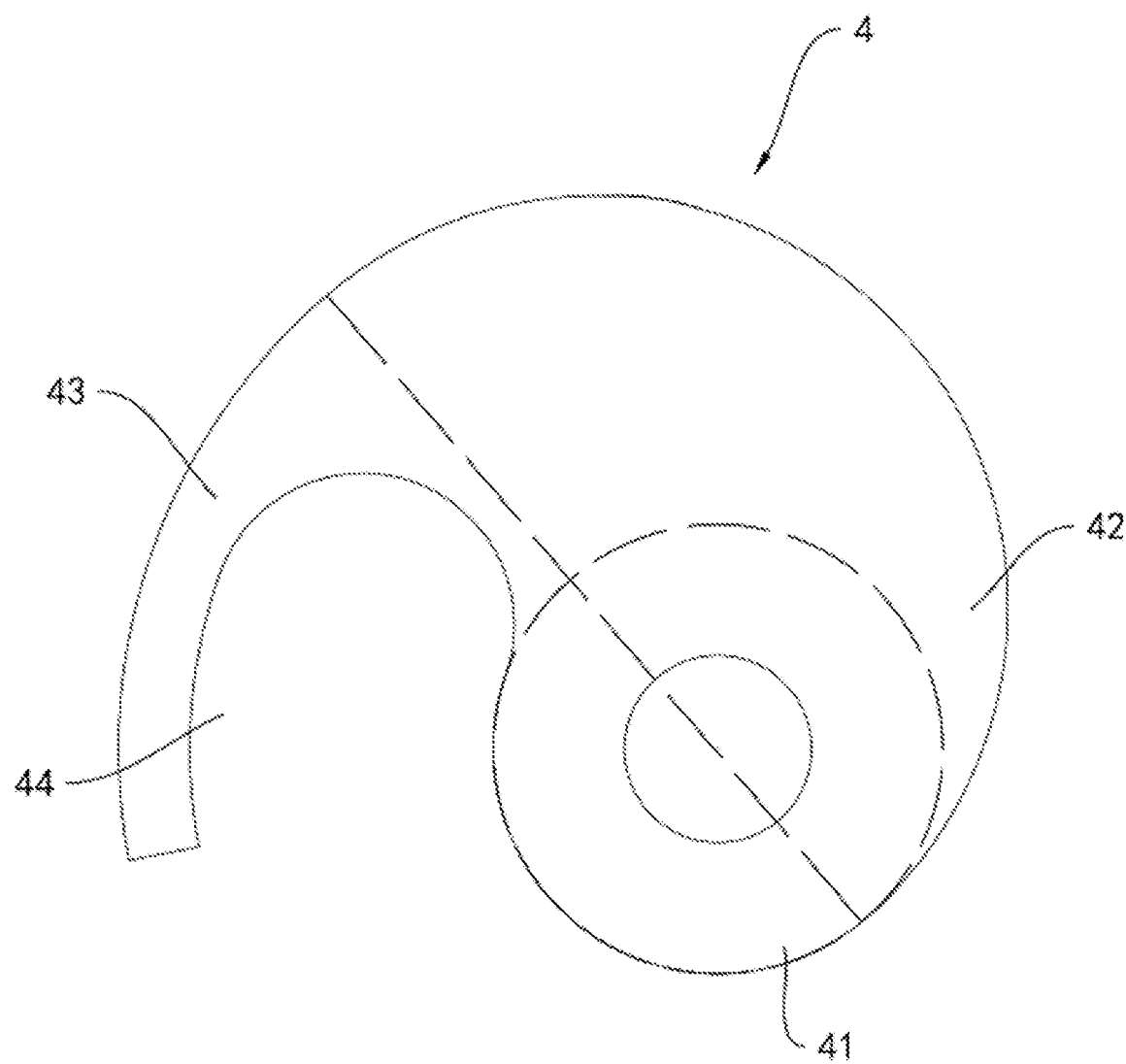
FIG. 4 is a structural diagram of a cam.

Referring to FIG. 4, the cam 4 includes a circular base body 41 coaxially arranged with the output shaft 31 of the double head motor 3, and a radius varying portion 42 with an increasing distance from the edge to the circle center of the base body 41 is arranged at the edge of the base body 41. The radius varying portion 42 is integrally formed with the base body 41. The connecting line from an end closest to the circle center of the base body 41 to an end furthest from the circle center of the base body 41 passes through a circle center of the base body 41.

An arc-shaped extension 43 concentric with the circle center of the base body 41 is arranged at the end of an upper edge of the radius varying portion 42 farthest from the circle center of the base body 41, and the extension 43 is integrally formed with the radius varying portion 42. An arc-shaped clamping slot 44 capable of clamping the roller 2121 is formed between the extension 43 and the base body 41, and the circle center of the clamping slot 44 is located on the circle center of the base body 41.

When the output shaft 31 of the double head motor 3 is reversely rotated, the radius varying portion 42 on the cam 4 pushes the bending portion 212 upward. When the roller 2121 on the bending portion 212 abuts against the outer wall of the extension 43, the position of the bending portion 212 remains unchanged.

Figure 6:
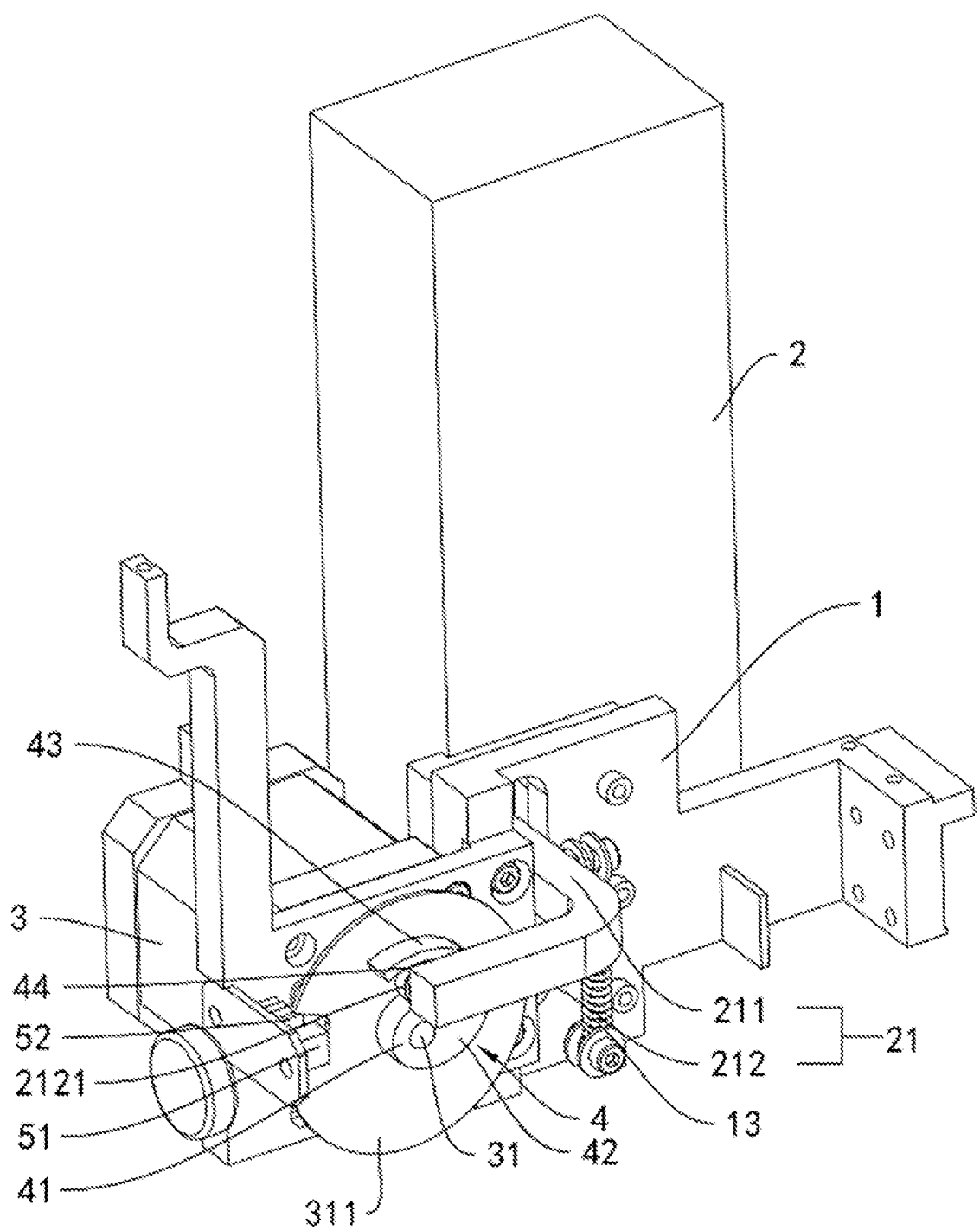
FIG. 6 is a structural diagram viewed from one side of the tail end of the double head motor when the photon counter is located at the lowest position.

Referring to FIGS. 2 and 4, when the roller 2121 of the bending portion 212 is located at one end of the extension 43 away from the radius varying portion 42, the rotation direction of the output shaft 31 of the double head motor 3 is changed, so that the output shaft 31 is rotated forwardly, and the bending portion 212 gradually moves downward under the action of the gravity of the photon counter 2 and the gravity of the sliding rod 21, until it reaches a position at the upper edge of the radius varying portion 42 closest to the circle center of the base body 41, where the height of the bending portion 212 does not change any more. Referring to FIG. 6, as the cam 4 continues to rotate, the roller 2121 on the bending portion 212 is clamped into the clamping slot 44, and the photon counter 2 is moved to the lowest position.

Figure 3:
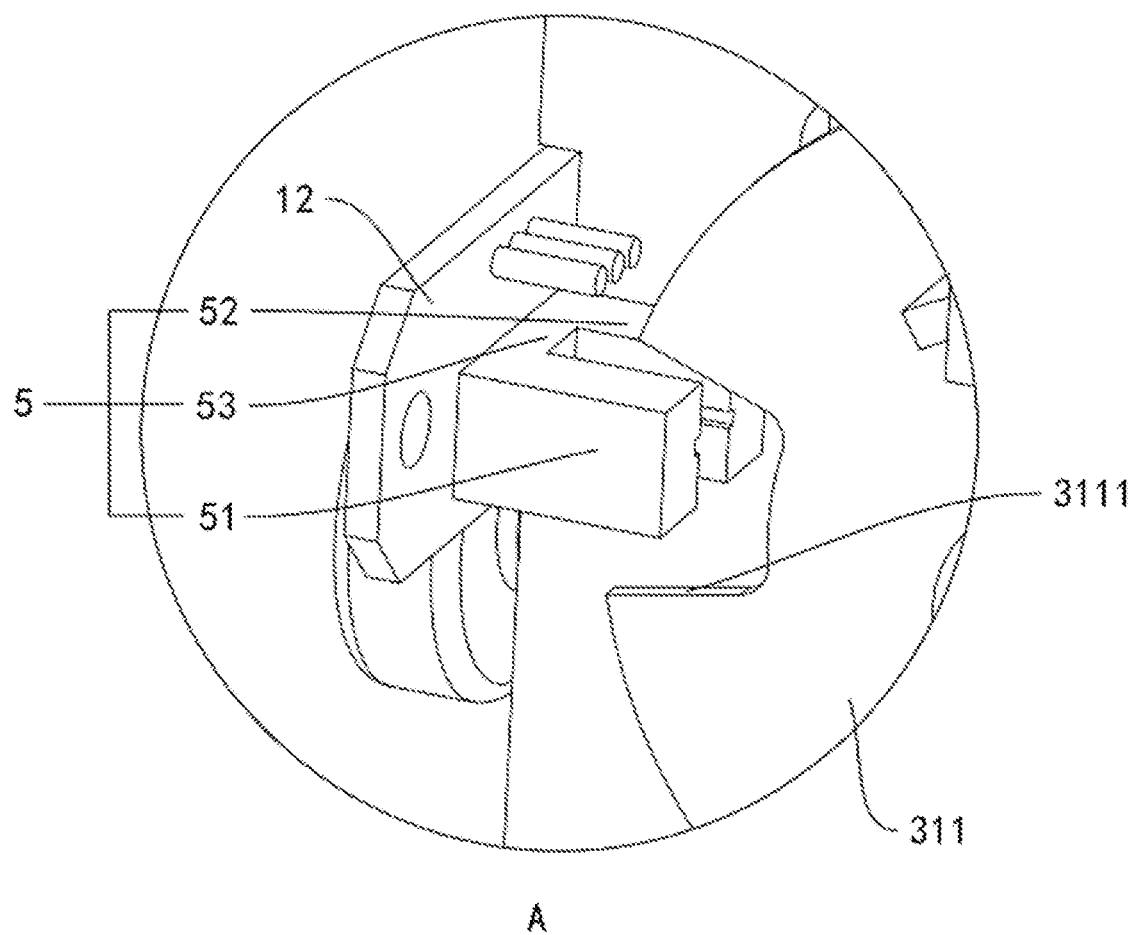
FIG. 3 is a partial enlarged view of part A in FIG. 2.

Referring to FIGS. 2 and 3, a circular turntable 311 is fixed on the output shaft 31 at the tail end of the double head motor 3, and a notch 3111 is arranged at an edge of the turntable 311. The turntable 311 is located between cam 4 and mounting seat 1. An outwardly protruded mounting block 12 is arranged on an side of the mounting seat 1 away from the double head motor 3, and the mounting block 12 is located on the outside of the turntable 311 and opposite to the turntable 311. A photoelectric switch 5 is fixed on a side of the mounting block 12 facing the turntable 311. The photoelectric switch 5 is in signal connection with the double head motor 3. The photoelectric switch 5 includes an infrared transmitting portion 51 and an infrared receiving portion 52 arranged opposite to each other. The infrared transmitting portion 51 and the infrared receiving portion 52 are connected through the connecting unit 53, and the connecting unit 53 is fixed to the mounting block 12. The infrared transmitting portion 51 and the infrared receiving portion 52 are located on opposite sides of the turntable 311, which separates the infrared transmitting portion 51 from the infrared receiving portion 52. When the turntable 311 is rotated with the output shaft of the double head motor 3, the notch 3111 on the turntable 311 can be turned to a position opposite to the infrared transmitting portion 51 and the infrared receiving portion 52. When the notch 3111 is in the position opposite to the infrared transmitting portion 51 and the infrared receiving portion 52, the infrared receiving portion 52 receives the signal sent by the infrared transmitting portion 51. When the infrared receiving portion 52 receives the signal, the rotation direction of the output shaft 31 of the double head motor 3 is controlled to change.

Referring to FIGS. 2 and 6, when the roller 2121 on the bending portion 212 is clamped in the clamping slot 44 of the cam 4 or the roller 2121 is located at one end of the extension part 43 away from the radius varying portion 42, the notch 3111 on the turntable 311 is located in a position opposite to the infrared transmitting portion 51 and the infrared receiving portion 52.

A vertically arranged tension spring 13 is arranged on a side of the mounting seat 1 away from the photon counter 2. One end of the tension spring 13 is fixedly connected with the sliding portion 211 of the sliding rod 21, and the other end of the tension spring 13 is fixed with a portion of the mounting seat 1 below the sliding trough 11. The tension spring 13 provides a pulling force when the sliding rod 21 moves downward, so as to ensure that the photon counter 2 can move downward smoothly.

Figure 7:
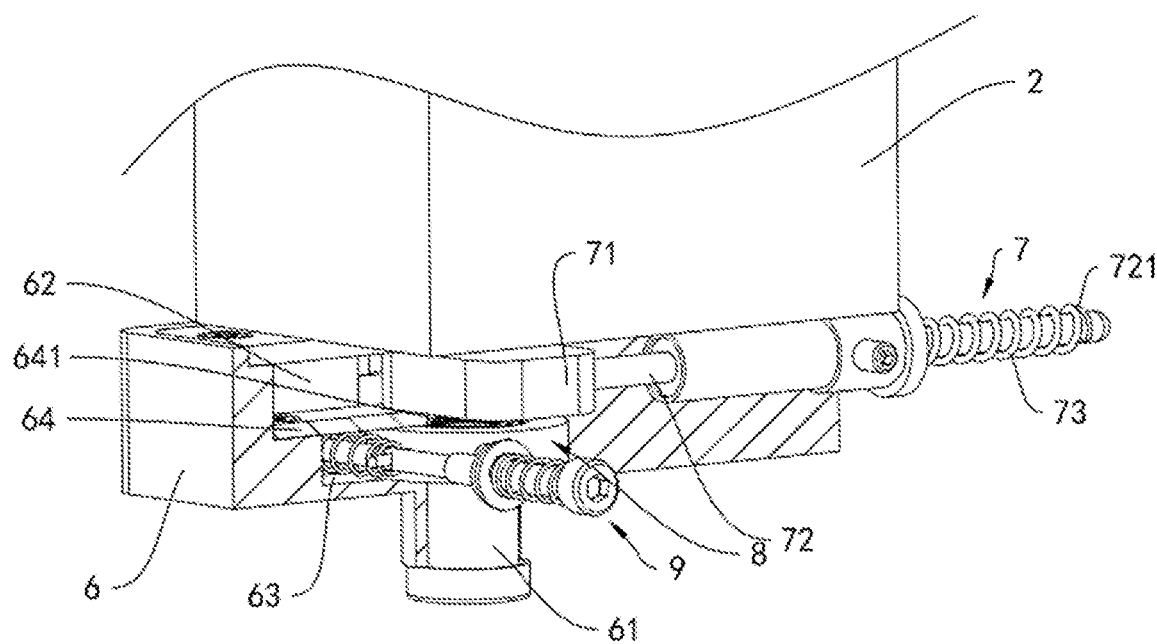
FIG. 7 is a schematic diagram of the internal structure of the box body.

Referring to FIG. 7, the bottom end of the photon counter 2 is provided with a hollow box 6 fixed with the photon counter 2, and the data acquiring port of the photon counter 2 passes through a side wall of the box 6 to communicate with the interior of the box 6. A light inlet 61 is arranged on a side wall of the box body 6 away from the photon counter 2, opposite to the data acquiring port of the photon counter 2, and the light inlet 61 communicates the interior of the box body 6 with the outside thereof.

A first cavity 62 and a second cavity 63 are successively provided inside the box body 6 from one end close to the photon counter 2 to one end away from the photon counter 2. A partition 64 is arranged between the first cavity 62 and the second cavity 63, and fixedly connected with the box body 6. A communication hole 641 is arranged on the partition 64 coaxially with and opposite to the light inlet 61.

A shutter structure 7 is arranged inside the first cavity 62. The shutter structure 7 includes a light-blocking block 71 in lateral sliding connection with the first cavity 62, which can completely cover the communication hole 641. When moving, the light-blocking block 71 is moved against the partition 64. In the first cavity 62, an accommodation space capable of completely accommodating the light-blocking block 71 is arranged on a side of the communication hole 641 away from the double head motor 3.

One end of the light-blocking block 71 facing the double head motor 3 is provided with a push rod 72 penetrating the box body 6 and exposed to one side wall of the double head motor 3. One end of the push rod 72 is fixedly connected with the light-blocking block 71, and the other end of the push rod 72 is a free end. The position of the push rod 72 is opposite to the output shaft 31 at a head end of the double head motor 3. When the photon counter 2 is moved to the uppermost position, a height of the push rod 72 is lower than the output shaft 31 of the double head motor 3. A side wall at the free end of the push rod 72 is provided with an outwardly protruded retaining ring 721, and the retaining ring 721 is integrally formed or fixedly connected with the push rod 72. A return spring 73 is arranged on the push rod 72, and sleeved on the push rod 72. One end of the return spring 73 abuts against an outer surface of the box body 6, and the other end of the return spring 73 abuts against the retaining ring 721 on the push rod 72.

Figure 5:
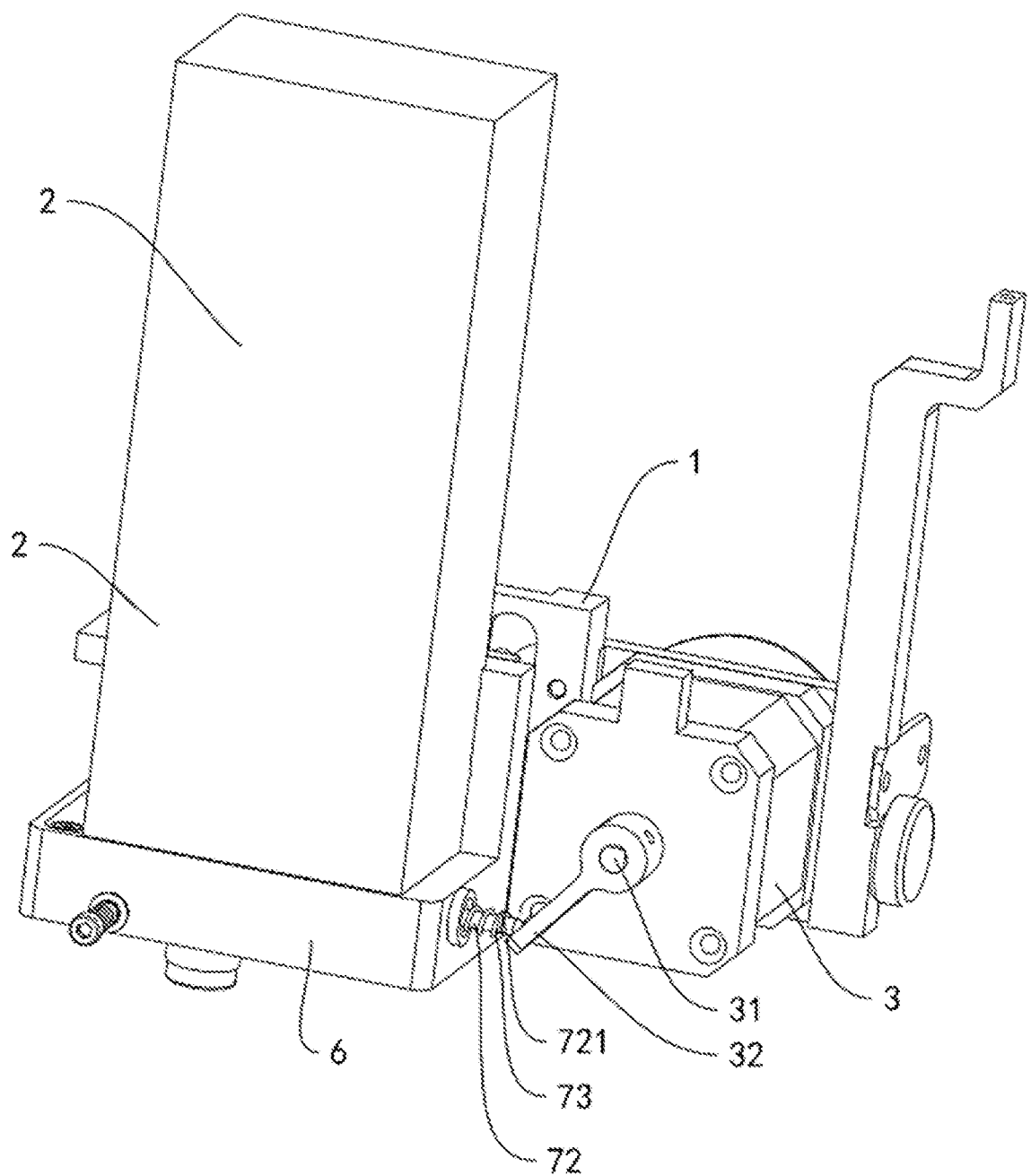
FIG. 5 is a structural diagram viewed from one side of the head end of the double head motor when the photon counter is located at the lowest position.

Referring to FIG. 5, a driving level 32 is fixed on the output shaft 31 at the head end of the double head motor 3, and the driving level 32 is vertically arranged and fixedly connected with the output shaft 31. The driving level 32 is arranged opposite to the push rod 72. When the driving level 32 is rotated in a forward rotation of the output shaft 31, the driving level 32 can push the push rod 72 to move in the direction of the box body 6.

Referring to FIGS. 5 and 6, for acquiring photon data, the output shaft 31 of the double head motor 3 is rotated forwardly. With the forward rotating of the double head motor 3, the photon counter 2 is moved downward, approaching the detected object. When the roller 2121 on the sliding rod 21 is clamped inside the card slot 44, the driving level 32 at the head end of the double head motor 3 pushes the push rod 72, so as to completely move the light-blocking block 71 away from the communication hole 641 on the partition 64. At this time, the data acquiring port of the photon counter 2 is communicated with the light inlet 61, so that the photon counter 2 can acquire data from a detected object. When the output shaft 31 of the double head motor 3 is reversely rotated, the return spring 73 pushes the retaining ring 721 to move the push rod 72 toward the outside of the box body 6, so that the light-blocking block 71 covers the communication hole 641 again.

Figure 8:
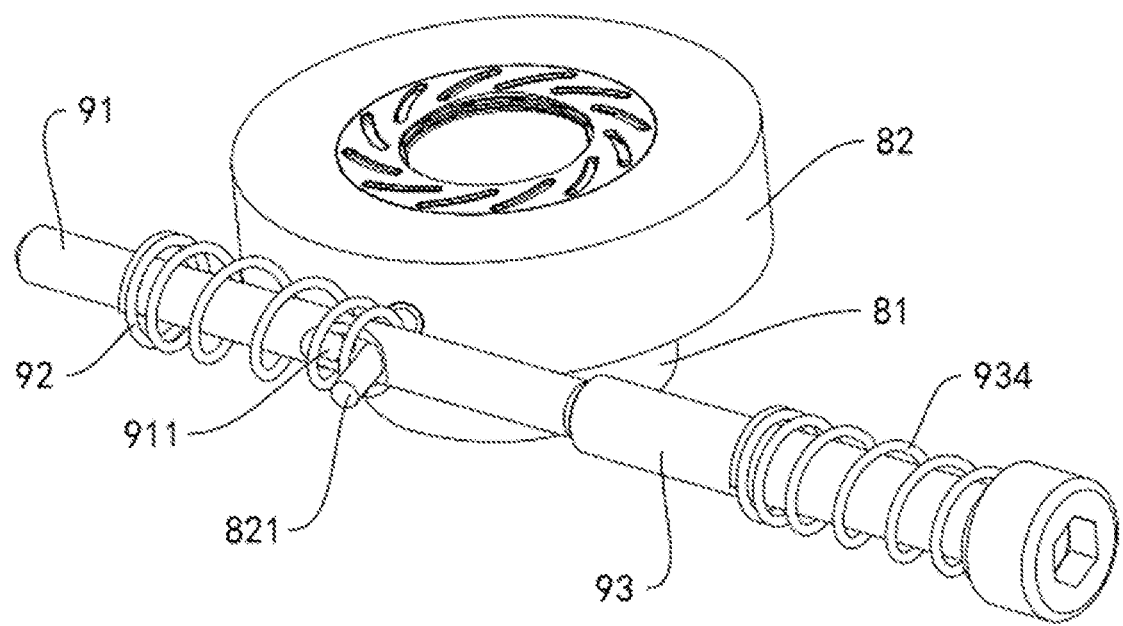
FIG. 8 is a schematic diagram of the connection structure between the adjusting structure and the variable diaphragm.

Referring to FIGS. 7 and 8, a variable diaphragm 8 is fixed inside the second cavity 63 of the box body 6. The variable diaphragm 8 adopts a conventional model SK104 variable diaphragm. The variable diaphragm 8 is located between and communicated with the communication hole 641 of the partition 64 and the light inlet 61. The variable diaphragm 8 includes a fixed ring 81 fixed inside the second cavity 63, a plurality of diaphragm sheets located inside the fixed ring 81, and a moving ring 82 rotatably connected with the fixed ring 81. The fixing ring 81 communicates the communication hole 641 with the light inlet 61. When the moving ring 82 and the fixed ring 81 are rotated relative to each other, the diaphragm sheets are swung to change an optical aperture.

Figure 9:
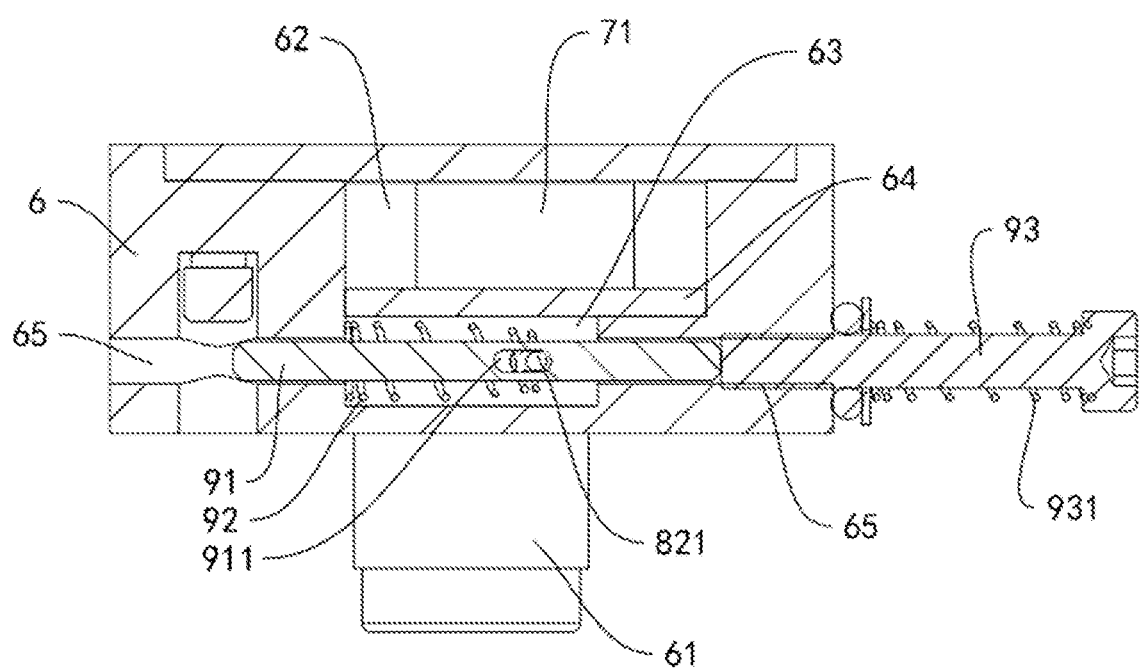
FIG. 9 is a sectional view of the connection between the adjusting structure and the box body.

An adjusting structure 9 for rotating the moving ring 82 is further arranged inside the second cavity 63. Referring to FIGS. 8 and 9, the adjusting structure 9 includes an adjusting rod 91 slidably connected inside the second cavity 63. Sliding holes 65 are respectively arranged on a side wall of the box body 6 facing the mounting seat 1 and a side wall of the box body 6 away from the mounting seat 1, and the two sliding holes 65 are coaxially arranged opposite to each other. Both ends of the adjusting rod 91 are respectively inserted into opposite sliding holes 65 and slidably connected with the sliding holes 65. The adjusting rod 91 is arranged perpendicular to an axial direction of the moving ring 82 of the variable diaphragm 8. A long strip-shaped adjusting groove 911 is arranged on the adjusting rod 91, and the adjusting groove 911 is arranged opposite to the moving ring 82. A connecting rod 821 is fixed on the moving ring 82, one end of the connecting rod 821 is fixedly connected with the moving ring 82, one end of the connecting rod 821 is inserted into the adjusting groove 911, and one end of the connecting rod 821 inserted into the adjusting groove 911 can be moved in the adjusting groove 911.

A telescopic spring 92 is arranged on the adjusting rod 91. One end of the telescopic spring 92 abuts against a side wall of the box body 6 facing the mounting seat 1, and the other end abuts against the connecting rod 821. By means of the elastic force of the telescopic spring 92, the connecting rod 821 abuts against one end of the adjusting groove 911 away from the side wall of the box body 6 and close to the mounting seat 1. An adjusting bolt 93 opposite to the adjusting rod 91 is arranged on a side wall of the box body 6 away from the mounting seat 1, and is connected with the sliding hole thread on the side wall of the box body 6 away from the mounting seat 1.

When it needs to adjust the optical aperture of the variable diaphragm 8, the adjusting bolt 93 is rotated to move the adjusting rod 91 and synchronously drive the connecting rod 821 to move. With the movement of the connecting rod 821, the moving ring 82 and the fixed ring 81 are driven to rotate relative to each other. By means of the adjusting structure 9 and the variable diaphragm 8, the optical aperture of the variable diaphragm 8 can be adjusted as needed.

A portion of the adjusting bolt 93 located outside the box body 6 is provided with a locking spring 931. The locking spring 931 is sleeved on the adjusting bolt 93. One end of the locking spring 931 abuts against the side wall of the box body 6, and the other end abuts against a nut of the adjusting bolt 93.

The embodiments of the specific embodiments are the preferred embodiments of the present application and do not limit the protection scope of the present application. Therefore, all equivalent changes made according to the structure, shape and principle of the present application shall be covered by the protection scope of the present application.

What is claimed is:

1. A photon measuring and reading device, comprising a mounting seat and a photon counter with a data acquiring port facing downward, and the photon counter is capable of moving up and down on the mounting seat, wherein
    the mounting seat is provided with a sliding trough running through the mounting seat and arranged vertically, and the photon counter is fixed with a sliding rod passing through the sliding trough and slidably connected with the sliding trough;
    the mounting seat is provided with a double head motor having output shafts at a head end and at a tail end and arranged laterally side by side with the photon counter, the output shaft at the tail end of the double head motor extends through and out of the mounting seat, and a linkage mechanism for driving the sliding rod to move up and down is arranged between the output shaft at the tail end of the double head motor and the sliding rod;
    a hollow box body is fixed at a bottom end of the photon counter, the data acquiring port of the photon counter is communicated with an interior of the box body, a side wall of the box body away from the photon counter is provided with a light inlet opposite to the data acquiring port of the photon counter, a light-blocking block capable of covering the light inlet is arranged in the box body, a push rod extending through the side wall of the box body is arranged at one end of the light-blocking block facing the double head motor, the push rod is slidably connected with the side wall of the box body, one end of the push rod is fixedly connected with the light-blocking block, and the other end of the push rod is located outside the box body, acting as a free end of the push rod; and
    a driving level is arranged on the output shaft at the head end of the double head motor, and is capable of pushing the push rod so that the light-blocking block is moved off the light inlet when the photon counter is moved to a lowest position; and the box body is provided with an elastic resetting member configured to push the push rod to move towards the outside of the box body, so that the light-blocking block is positioned opposite to the light inlet.

2. A photon measuring and reading device according to claim 1, wherein the linkage mechanism comprises a cam fixed on the output shaft at the tail end of the double head motor, the sliding rod comprises a sliding portion passing through the sliding trough and slidably connected with the sliding trough, and an end of the sliding portion away from the photon counter is provided with a bending portion extending toward the double head motor and positioned above the cam, and the cam is capable of driving the bending portion to move up and down when being rotated with the output shaft at the tail end of the double head motor.

3. A photon measuring and reading device according to claim 2, wherein a roller is arranged between the bending portion and the cam, and the roller is rotationally connected to the bending portion.

4. A photon measuring and reading device according to claim 3, wherein the cam comprises a base body coaxially arranged with the output shaft at the tail end of the double head motor, an edge of the base body is provided with a radius varying portion with gradually increased distance from an edge to a circle center of the base body, an end of the radius varying portion having a farthest distance from the edge to the circle center of the base body is provided with an arc-shaped extension part concentric with the base body, an arc-shaped clamping slot capable of clamping the roller is formed between the extension part and the base body, a circle center of the clamping slot is located on the circle center of the base body, and the mounting seat is provided with a control mechanism for controlling the output shaft at the tail end of the double head motor to rotate forward and reverse alternately.

5. A photon measuring and reading device according to claim 4, wherein the control mechanism comprises a photoelectric switch installed on the mounting seat and a turntable fixed on the output shaft at the tail end of the double head motor, a notch is arranged at an edge of the turntable, the photoelectric switch is in signal connection with the double head motor, and comprises an infrared transmitting portion and an infrared receiving portion respectively located on opposite sides of the turntable, and the infrared transmitting portion and the infrared receiving portion are arranged opposite to each other, and the notch is capable of being positioned opposite to the infrared transmitting portion and the infrared receiving portion when the turntable is rotated with the output shaft of the double head motor.

6. A photon measuring and reading device according to claim 1, wherein the mounting seat is provided with an elastic pulling piece for pulling the sliding rod to move downward.

7. A photon measuring and reading device according to claim 1, wherein a variable diaphragm with an adjustable optical aperture is arranged between the light-blocking block and the light inlet in the interior of box body.

8. A photon measuring and reading device according to claim 7, wherein the variable diaphragm comprises a fixed ring fixed inside the box body and a plurality of diaphragm sheets located inside the fixed ring, the diaphragm sheets are configured to be swung to change the optical aperture when a moving ring is rotated relative to the fixed ring and the box body is provided with an adjusting structure for rotating the moving ring.

9. A photon measuring and reading device according to claim 8, wherein the adjusting structure comprises an adjusting rod slidably connected with the box body, an axis of the adjusting rod is arranged perpendicular to an axis of the moving ring, the adjusting rod is provided with an adjusting groove having a length arranged along an axial direction of the adjusting rod, the moving ring is provided with a connecting rod, the connecting rod extends into the adjusting groove and is slidably connected with the adjusting groove, the connecting rod is sleeved with a telescopic spring, one end of the telescopic spring abuts against the side wall of the box body, the other end of the telescopic spring abuts against the connecting rod, one end of the adjusting rod is provided with a pushing member configured to push the adjusting rod to move along its own axial direction, and the pushing member extends out of the box body.

10. A photon measuring and reading device according to claim 9, wherein the pushing member comprises an adjusting bolt connected with a thread of the box body, the adjusting bolt is provided with a locking spring, one end of the locking spring abuts against a nut of the adjusting bolt, and the other end of the locking spring abuts against the box body.

* * * * *